United States Patent
Paschke et al.

(10) Patent No.: US 11,196,359 B2
(45) Date of Patent: Dec. 7, 2021

(54) SUPERVISORY MONITOR FOR ENERGY MEASUREMENT

(71) Applicant: Micro Motion Inc., Boulder, CO (US)

(72) Inventors: Randy K. Paschke, Golden Valley, MN (US); Shari N. Durdin, Maple Grove, MN (US); Walter C. Baker, Victoria, MN (US); Cheng C. Vue, Blaine, MN (US); Brian S. Junk, Plymouth, MN (US)

(73) Assignee: Micro Motion Inc., Boulder, CO (US)

( * ) Notice: Subject to any disclaimer, the term of this patent is extended or adjusted under 35 U.S.C. 154(b) by 236 days.

(21) Appl. No.: 16/369,137

(22) Filed: Mar. 29, 2019

(65) Prior Publication Data

US 2019/0348929 A1    Nov. 14, 2019

Related U.S. Application Data

(60) Provisional application No. 62/670,241, filed on May 11, 2018.

(51) Int. Cl.
| | |
|---|---|
| *H02K 44/04* | (2006.01) |
| *H02K 7/18* | (2006.01) |
| *G01F 1/66* | (2006.01) |
| *H02N 3/00* | (2006.01) |
| *G06Q 50/06* | (2012.01) |

(52) U.S. Cl.
CPC .............. *H02N 3/00* (2013.01); *G06Q 50/06* (2013.01)

(58) Field of Classification Search
CPC ....... G01F 1/662; H02K 44/04; H02K 7/1846
USPC ................................. 73/861; 310/10, 11, 68 B
See application file for complete search history.

(56) References Cited

U.S. PATENT DOCUMENTS

| | | | | |
|---|---|---|---|---|
| 3,946,608 | A | * | 3/1976 | Herzl .................... G01F 1/3263 73/861.24 |
| 2016/0025536 | A1 | * | 1/2016 | Madsen ................. G06F 17/18 702/45 |
| 2016/0099570 | A1 | * | 4/2016 | The' ........................ H02J 7/34 307/72 |

FOREIGN PATENT DOCUMENTS

| | | | |
|---|---|---|---|
| JP | 09005127 | A | 1/1997 |
| JP | 09005127 | A * | 7/1997 |
| KR | 20030096797 | A * | 12/2003 |
| KR | 1020030096797 | A | 12/2003 |

OTHER PUBLICATIONS

English Translation KR20030096797 (Year: 2003).*
English Translation JP09005127 (Year: 1997).*
(Continued)

*Primary Examiner* — Jose A Gonzalez Quinones
(74) *Attorney, Agent, or Firm* — Christopher R. Christenson; Kelly, Holt & Christenson PLLC

(57) ABSTRACT

A field device includes process communication circuitry configured to communicate in accordance with a process communication protocol. A controller is coupled to the process communication circuitry. The controller includes timing circuitry and is configured to generate periodic time signals during an operational period of the field device and store an indication of operational time based on the periodic time signals in non-volatile memory. The controller is configured to employ the process communication circuitry to provide an indication of operational time to a remote device.

19 Claims, 4 Drawing Sheets

(56) References Cited

OTHER PUBLICATIONS

International Search Report and Written Opinion for International Patent Application No. PCT/US2019/031030, dated Aug. 23, 2019, date of filing: May 7, 2019, 15 pages.
First Chinese Office Action dated Jul. 3, 2020 for Chinese Patent Application No. 201910395916.4, 24 pages including English translation.
Seceond Chinese Office Action dated Mar. 29, 2021 for Chinese Patent Application No. 201910395916.4, 26 pages including English translation.

* cited by examiner

SUPERVISORY MONITOR FOR ENERGY MEASUREMENT

CROSS-REFERENCE TO RELATED APPLICATIONS

The present application is based on and claims the benefit of U.S. Provisional Patent Application Ser. No. 62/670,241 filed May 11, 2018, the content of which is hereby incorporated by reference in its entirety.

BACKGROUND

In some industries, flowmeters are used to measure or monitor the flow of fluids, such as steam, natural gas, process gasses, fuels, et cetera in order to provide custody transfer functions. Custody transfer, within the oil and gas industry, typically refers to the transportation of a physical substance, such as natural gas, from one location to another. Such transfer may be from a tanker to a ship, between tanks, et cetera.

In operation, some flowmeters may not have access to permanent power sources. For example, installing permanent power sources may be too expensive or otherwise infeasible for a public utility location. In this example, a variety of other devices may be used to generate power. One such device is an energy harvester. Energy harvesters provide power by harvesting thermoelectric energy from the environment and, as a result, are able to provide power in any location that energy is available from the environment.

However, environmental conditions may exist in which an energy harvester is unable to generate enough power to continuously power the flowmeter. For example, if the energy harvester uses differences in environmental temperature to generate electricity, and the environmental temperature difference abates or attenuates, the energy harvester may not be able to provide enough energy to power the flowmeter. In such instances, the flowmeter will shut down and remain so until the energy harvester is able to harvest enough energy to re-power the flowmeter.

Once shut down, the flowmeter may not be able to accurately measure flow during custody transfer operations. In turn, this can result in under-billing of totalized flow or energy measurements. Additionally, current flowmeters, energy harvesters and other industrial measurement devices do not contain internal power sources to maintain timekeeping when unpowered. As a result, an operator may be unable to determine how long a particular flowmeter or industrial device had been shut down, and, therefore, lost billing time.

SUMMARY

A field device includes process communication circuitry configured to communicate in accordance with a process communication protocol. A controller is coupled to the process communication circuitry. The controller includes timing circuitry and is configured to generate periodic time signals during an operational period of the field device and store an indication of operational time based on the periodic time signals in non-volatile memory. The controller is configured to employ the process communication circuitry to provide an indication of operational time to a remote device.

DETAILED DESCRIPTION OF ILLUSTRATIVE EMBODIMENTS

During custody transfer operations, flowmeters or other industrial devices may be utilized to monitor a flow rate or other custody transfer functions. To power the flowmeters or other such devices, a variety of energy sources may be used. One such example is an energy harvester that harvests thermoelectric energy from an environment. However, environmental conditions may exist that prevent the energy harvester from adequately generating enough power for the flowmeters or other devices. For example, temperature differences within an environment may attenuate leading to an inadequate harvesting of thermoelectric energy. In turn, the flowmeters or other devices may be shut down leading to inaccurate energy or totalized flow measurements within a custody transfer operation.

In accordance with embodiments of the present invention, a field device such as a flowmeter and/or energy harvester is provided that includes circuitry, logic, software, or any combination thereof, to provide an indication of accumulated time during operation of the field device and/or energy harvester. In turn, if the field device is shut off due to an inadequate supply of power, a determination can be made as to a total amount of time in which the field device was shut down based on the indication of accumulated time and a total elapsed time. This allows an operator to accurately determine how much time was unaccounted for, and to take corrective actions to make corrections to the flow totals that occurred during the downtime. Additionally, this may allow operator to accurately bill for the particular custody transfer operation.

While the present description will now proceed with respect to a flowmeter in the form of a vortex flowmeter, additional or different field devices may be used as well in accordance with embodiments of the present invention. This may include ultrasonic flowmeters, magnetic flowmeters, differential pressure flowmeters, coriolis flowmeters, turbine flow meters, or any other industrial process meters. Additionally, it is to be understood that the present invention may be utilized in a wide variety of other industrial devices in which an operating/shut down time is to be determined.

Figure 1:
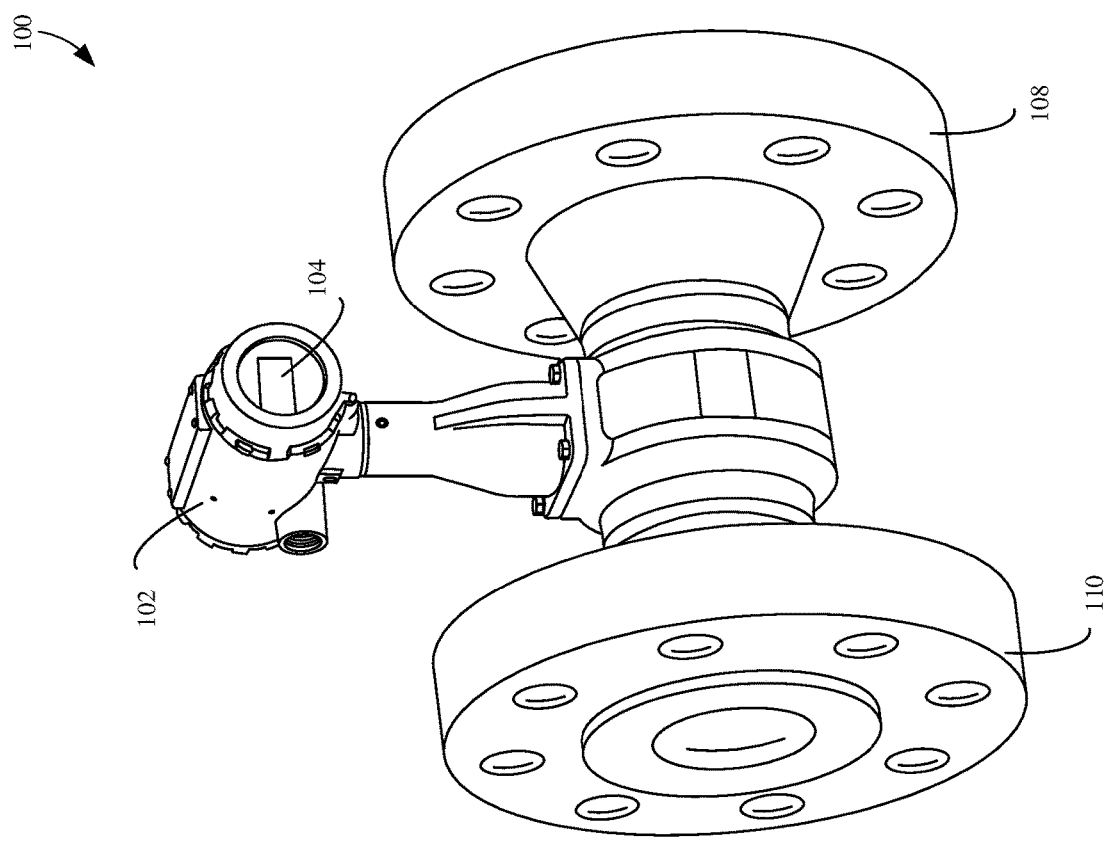
FIG. 1 is an exploded view of a vortex flowmeter in which embodiments of the present invention may be used.

FIG. 1 is a diagrammatic view of a vortex flowmeter in which embodiments of the present invention may be used. As illustratively shown, vortex flowmeter 100 includes electronics housing 102 with optional display 104. Vortex flowmeter 100 is illustratively shown including a pair of flanges 110 and 108 to couple to process fluid piping. Vortex flowmeter 100 includes a shedder bar or bluff body that is inserted into or otherwise disposed within the process fluid flow. The shedder bar or bluff body generates Karman vortices on alternate sides of the shedder bar or bluff body. The frequency of vortex generation is proportional to the flow velocity. One example of a commercially available vortex flowmeter is sold under the trade designation 8800 Series Vortex Flow Meters available from Emerson Automation Solutions of St. Louis, Mo.

As will be discussed in more detail below, upon determining a mass flow rate and/or a volume flow, a display may be generated, and/or an indication provided over communication circuitry to other remote systems. In turn, this can allow for an accurate determination as to a total flow of fluid during a custody transfer operation.

Figure 2:
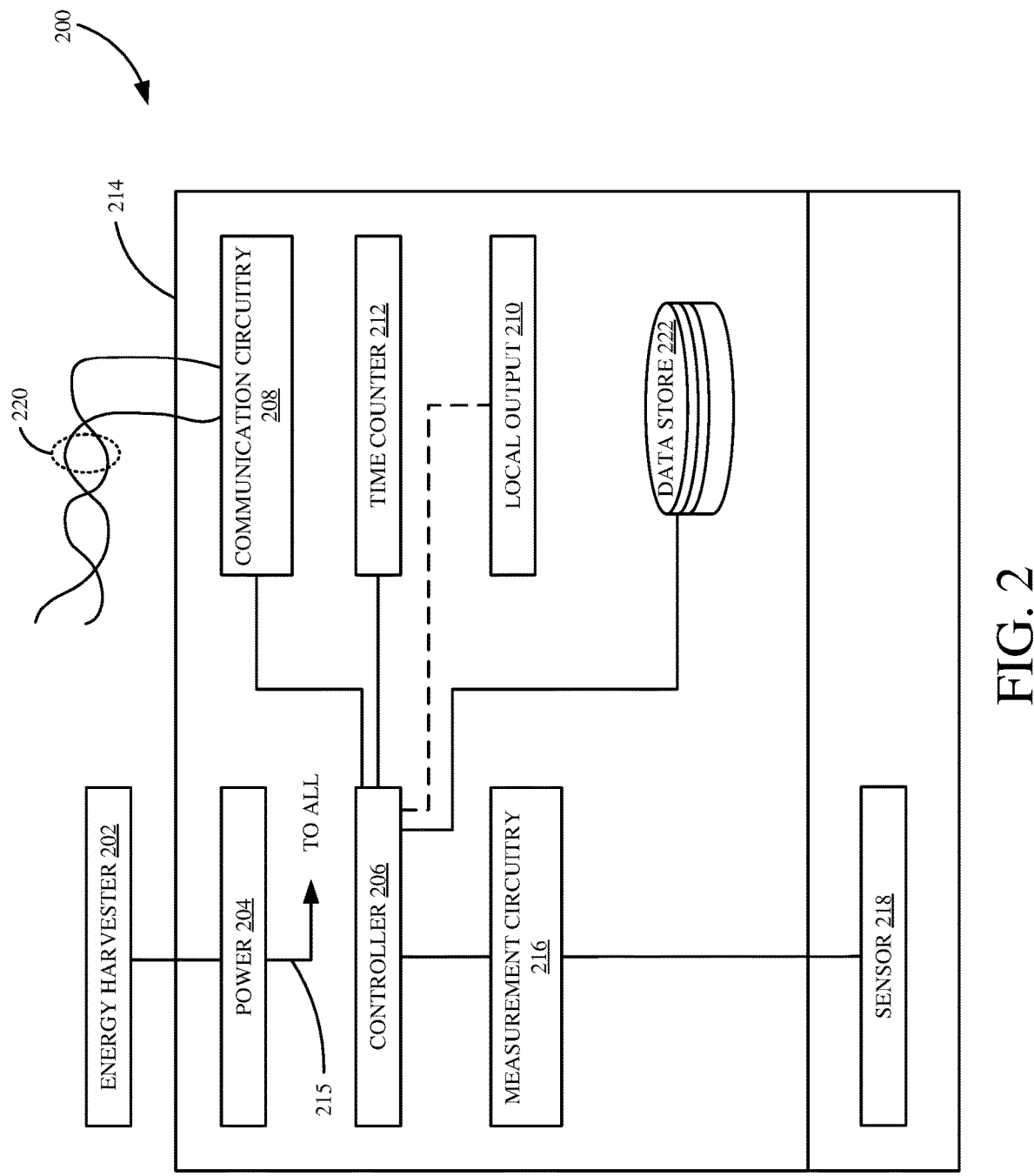
FIG. 2 is a block diagram of a flowmeter assembly in accordance with embodiments of the present invention.

FIG. 2 is a block diagram of a flowmeter assembly in accordance with embodiments of the present invention. Flowmeter assembly 200 illustratively includes electronics 214 disposed within housing 102 of vortex flowmeter 100 coupled to an energy harvester 202 that provides power to one or more components of flowmeter 100. Electronics 214 illustratively includes power circuitry 204, a controller 206, communication circuitry 208, measurement circuitry 216, a local output 210, a data store 222 and a time counter 212. During operation of flowmeter 100, time counter 212 is configured to generate signals indicative of an operating time, or accumulated operating time, of flowmeter assembly 200 and/or energy harvester 202. Before describing the operation of time counter 212 in further detail, a brief description of the other components within electronics 214 will first be provided.

Communication circuitry 208 is configured to be coupled to a process communication loop through conductors 220. By virtue of coupling to process communication loop 220, communication circuitry 208 allows flowmeter 100 to communicate with an industry-standard process communication protocol. Examples include the Highway Addressable Remote Transducer (HART®) protocol, the FOUNDATION™ Fieldbus protocol, among others. In some examples, communication circuitry 208 also allows for electronics 214 of flowmeter 100 to communicate wirelessly with other devices, such as in accordance with IEC 62591 (WirelessHART).

Power module 204, in one example, receives power from energy harvester 202 and supplies suitable operating power to any or all components of electronics 214, as indicated by reference numeral 215 labeled "to all."

Local output 210 can include a wide variety of different components. However, in one example, local output 210 can include a local display device 104 (shown in FIG. 1), NFC-readable information, among a variety of other components. In one example operation, local output 210 can receive signals from controller 206 and can generate a user interface display based on the received signals. A generated display can include measured flow parameter information, a determination as to how long flowmeter assembly 200 was operating, or a wide variety of other information.

Energy harvester 202 generates power from the ambient environment and provides the generated power to power module 204 of electronics 214. Energy harvester 202 can include a wide variety of thermoelectric energy harvesters, but, in one example, can include a Perpetua® Power Puck® from Perpetua Power Source Technologies, Inc., of Corvallis, Oreg. However, this is but one example of a thermoelectric harvester and a wide variety of other energy harvesters may be used as well.

Measurement circuitry 216, in this example, is coupled to sensor 218 and is configured to detect Karman vortices within the process fluid. Measurement circuitry 216 can include one or more analog-to-digital converters, linearization and/or amplification circuitry, and provides an indication of one or more sensed analog values to controller 206 in the form of a digital signal.

Data store 222 can store any or all data pertaining to flowmeter 100 and/or energy harvester 202. In one example, data store 222 can include program data, process data and time counter data generated from time counter 212 as will be discussed later. Additionally, data store 222 can include volatile and/or non-volatile memory.

Time counter 212 can include circuitry, logic, software, or any combination thereof, that monitors a duration of active flow totalization, as measured by flowmeter assembly 200, and generates signals indicative of the monitored duration of flow. In one example, generated signals from time counter 212 can be automatically stored in non-volatile memory within data store 222. However, time counter signals can be stored in and/or provided to a variety of other locations as well.

In operation, as flowmeter assembly 200 monitors flow and generates signals during a custody transfer operation or other fluid transfer operation, time counter 212 records and generates signals indicative of a duration of time in which flowmeter assembly 200 is operational and/or actively monitoring a custody transfer or other fluid transfer operation.

By actively monitoring and generating signals indicative of a duration of time in which flowmeter assembly 200 is operating, an operator can, if circumstances exist, determine a period of time in which flowmeter assembly 200 is shut-down or non-operational. For example, if environmental conditions are present that hinder energy harvester 202 from gathering sufficient power, no power will be provided to flowmeter assembly 200 and flowmeter assembly 200 will be shut down. In this example, flowmeter assembly 200 will be unable to accurately monitor and generate signals pertaining to a custody transfer or other fluid transfer operation. In turn, this may lead to inaccurate billing, flow measurements, etc.

However, in accordance with different embodiments, once the environmental condition abates or sufficient power is able to return to flowmeter assembly 200, controller 206 can continue storing indications of operational time in non-volatile memory within data store 222. An external device or controller can then communicate with flowmeter assembly 200 to determine how much time has elapsed since a previous communication, and then compare the stored operational time from data store 222 with the actual elapsed time between the two communications in order to determine if any time was unaccounted for. For example, if a host communicated with flowmeter assembly every 10 minutes to check the operational time value, and upon communicating determines that the operational time value has only incremented by 7 minutes when in fact 10 minutes have passed, then the host or other suitable device can assess that 3 minutes of non-operational time occurred. Based on how much time was unaccounted for or passed since flowmeter assembly 200 was operational, the host or other suitable device can generate one or more process communication signals and/or cause flowmeter assembly 200 to set a local output 210 indicative of lost time. In one example, local output 210 can include an alarm function that serves to automatically alert an operator upon determining an unacceptable amount of time has passed since flowmeter assembly 200 was operating.

In some examples, if the identified time in which flowmeter assembly 200 was shut down exceeds a threshold value, the host or other suitable device can automatically or semi-automatically generate action signals for local output 210 and/or a remote system. Local output 210, upon receiving the actions signals, generates a display indicative of the identified amount of that has passed and/or an indication as to how long flowmeter assembly 200 was unpowered for.

In this manner, time counter 212 can act as a non-volatile hour meter internal to flowmeter assembly 200 that allows an operator to compare an entire operating duration to a period of time in which it was known flowmeter assembly 200 was actively monitoring an operation. Based on the comparison, an operator can determine a duration of time if flowmeter assembly 200 is ever not operating correctly. Furthermore, if it is determined that flowmeter assembly 200 was not operating correctly, an indication may be automatically generated for an operator such that corrective actions can be taken to remedy cumulative flow measurements among a variety of other parameters.

Alternatively, in other examples, generated time counter signals may be stored within data store 222 and used to provide proof of a continual operation of flowmeter assembly 200 over an extended period of time. For example, an operator or system may query controller 206 to collect time counter signals from data store 222 in order to generate an indication showing a total operating time for flowmeter assembly 200. Alternatively, generated time counter signals may also be provided to higher level systems such as a DCS or historian to indicate that flowmeter assembly 200 is properly operating in accordance with a particular fluid transfer operation.

Furthermore, while time counter 212 is illustratively a component of electronics 214, it is expressly contemplated time counter 212 may be within energy harvester 202. Also, it is to be understood that time counter 212 and controller 206 can be used in any field device in which an indication of accumulated time may be useful. Additionally, while time counter 212 generates time counter signals indicative of an operating time of flowmeter assembly 200, time counter 212 may also be configured to generate signals indicative of a duration of time in which a field device is operating under specific conditions. For example, for a gas flow in smart fluid diagnostics or flow measurements during an alarm condition. In this example, a duration of time during which an alarm condition exists may be excluded from a total operational time of a field device. However, time counter 212 and controller 206 may be configured in a variety of other ways as well.

Controller/processor 206 is coupled to communication circuitry 208, time counter 212, measurement circuitry 216, and, optionally, a local output 210 which can take the form of a display device 104, NFC-readable information, alert functionality, among a wide variety of other components and devices. In some examples, controller/processor 206 can include a microprocessor with its own memory that allows controller/processor 206 to programmatically execute one or more functions mentioned above or in relation to other components of flowmeter assembly 200.

In operation, controller/processor 206 receives signals from measurement circuitry 216 and is able to determine a mass flow rate, a volume, or other characteristic of a fluid transfer operation. Additionally, upon receiving sufficient power from energy harvester 202, controller 206 can be configured to semi-automatically or automatically retrieve time counter signals from data store 222. Based on the time counter signals, a remote host or DCS system can compare the operating time of flowmeter assembly 200 to an entire duration of a fluid transfer operation. From the comparison, the DCS can identify a duration of time in which flowmeter assembly 200 was unpowered or otherwise nonoperational during the fluid transfer operation.

In one example, if the comparison indicates flowmeter assembly 200 was non-powered for a significant portion of the fluid transfer operation, the host or DCS can automatically generate action signals for local output 210 or other remote systems to notify an operator of the identified duration. The operator can then correct for flow measurements, billing, et cetera.

Figure 3:
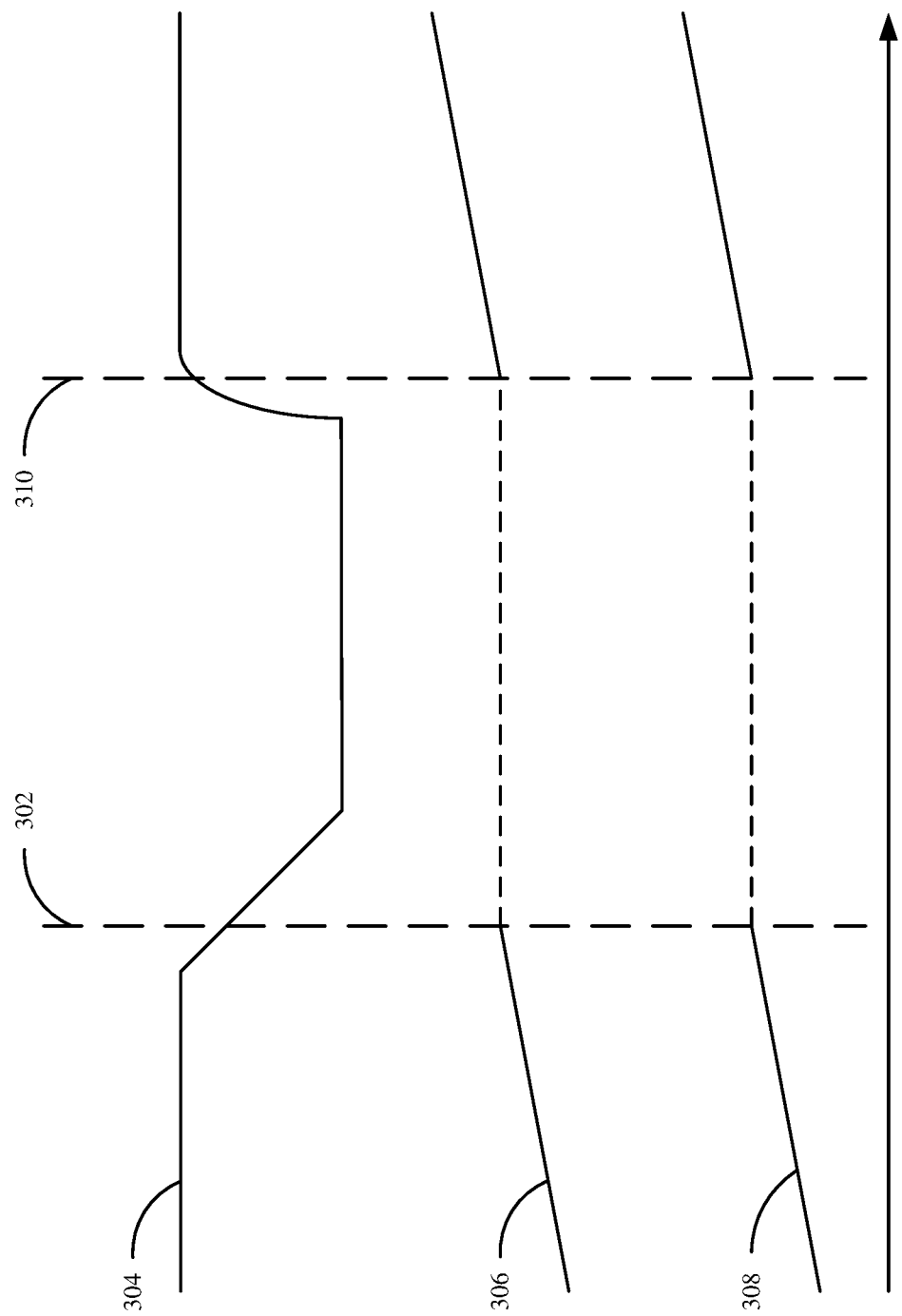
FIG. 3 is a flow diagram of received time and totalizer values during a power interruption in accordance with embodiments of the present invention.

FIG. 3 is a flow diagram of received time and totalizer values during a power interruption in accordance with embodiments of the present invention. In one example, line 304 corresponds to a supply voltage generated by energy harvester 202. At point 302, the supply voltage decreases resulting from energy harvester 202 being unable to generate sufficient electrical power. This persists up until point 310 when energy harvester 202 is able to re-generate sufficient electrical power for flowmeter assembly 200 and other components. This initial decrease at point 302 can be attributed to a weather condition abating or a variety of other reasons.

Additionally, line 306 illustratively corresponds to measurement values generated by flowmeter assembly 200 during a fluid transport operation. In one example, line 306 corresponds to flow totalization measurements during a fluid transport operation. As illustratively shown during the period in which no power is provided to flowmeter assembly 200 from energy harvester 202 (between points 302 and 310), a flow totalization value remains the same. However, fluid may continue to be transported during this time period in which flowmeter assembly 200 is not powered. Therefore, upon re-powering flowmeter assembly 200 at point 310, a flow totalization value at point 310 may not accurately reflect a cumulative flow totalization for the given fluid transport operation.

Furthermore, line 308 corresponds to generated time counter values from time counter 212. As illustratively shown, during operation of flowmeter assembly 200 in which flowmeter assembly 200 is monitoring and generating signals pertaining to a fluid transport operation, as illustratively shown by line 306, time counter 212 is simultaneously generating time counter values, as can be seen along line 308, indicative of an operating duration of flowmeter assembly 200. However, at point 302, when power is substantially reduced to flowmeter assembly 200, time counter 212 is unable to generate time counter values until energy harvester 202 is able to re-generate sufficient energy for flowmeter 200 as indicated by line 310.

However, in accordance with different embodiments, once power is restored to flowmeter assembly 200, generally along line 310, a remote host or DCS can communicate with flowmeter assembly 200 to retrieve the indication of total operating time and compare that value with actual elapsed time. Based on the comparison, the host or DCS can determine a duration of time in which flowmeter assembly 200 was not operational (aka between points 302 and 310). If the duration between points 302 and 310 exceeds a threshold, the host or DCS can generate signals and/or a display for an operator. An operator may then be able to modify or estimate the flow totalization values between the period of 302 and 310 based on average of flow rates before and after the power interruption and the duration of time in which the flowmeter 200 was not operational.

Figure 4:
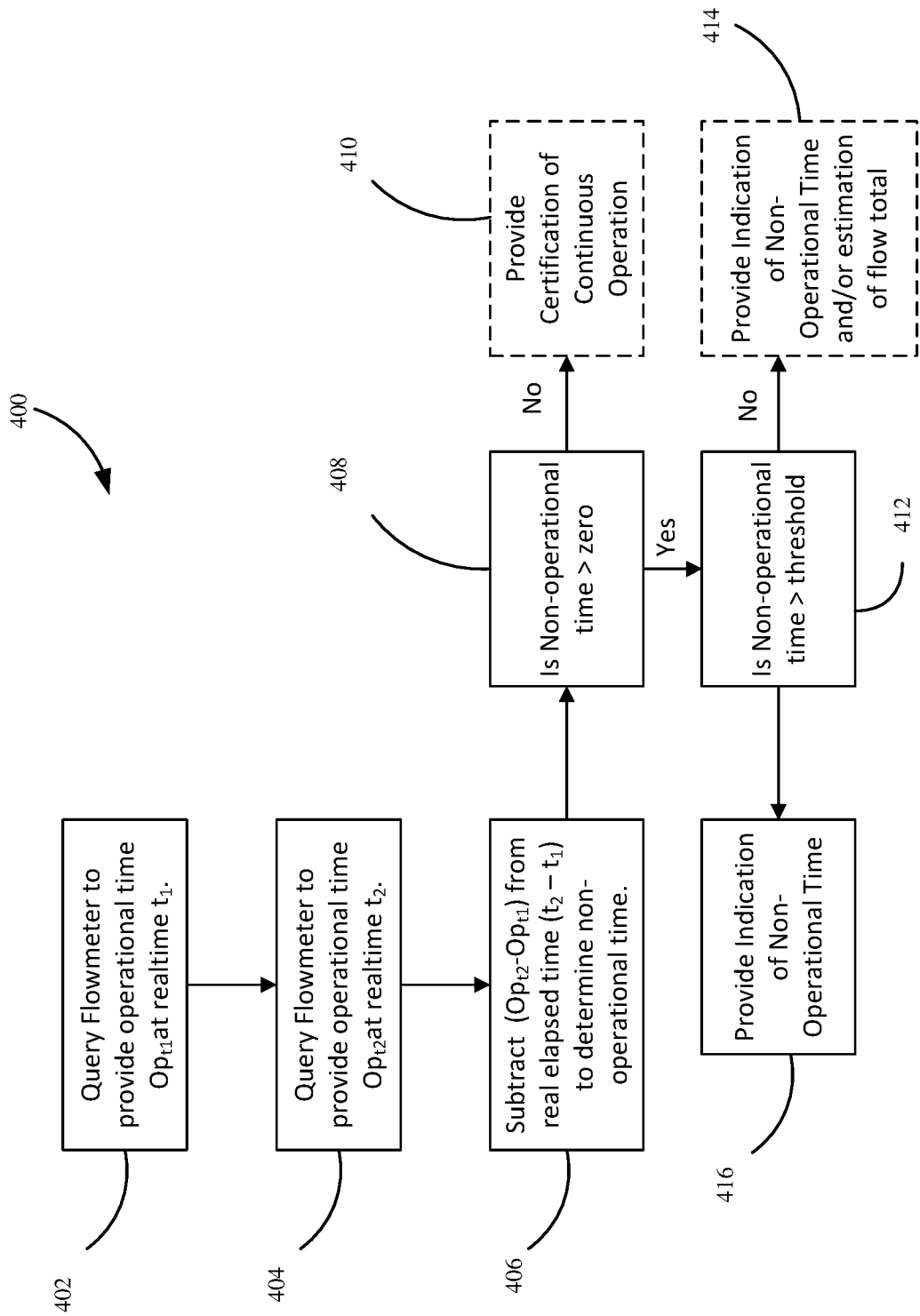
FIG. 4 is a flow diagram of a method of monitoring flow using a flowmeter and energy harvester in accordance with an embodiment of the present invention.

FIG. 4 is a flow diagram of a method of monitoring flow using a flowmeter and energy harvester in accordance with an embodiment of the present invention. Method 400 begins at block 402 where a host or other remote device with knowledge of the current real-time $t_1$ (by virtue of a real-time clock, network time service, or radio time service) queries the flowmeter using process communication to provide an indication of the flowmeter's stored operational time ($Op_{t1}$). Next, at block 404 the host or other remote device, at real-time $t_2$, queries the flowmeter to provide its stored operational time ($Op_{t2}$). At block 406, the difference in operational time ($Op_{t2}-Op_{t1}$) is subtracted from the difference in real-time ($t_2-t_1$). At block 408, the host or remote device determines if the result is greater than zero. If the result is not greater than zero, this indicates that the flowmeter has operated continuously over the interval. Optional block 410 may then be executed to provide a certification of continuous operation over the interval, which may be useful for some applications, such as custody transfer. If, however, the result of block 408 is greater than zero, then control passes to block 412, where the amount of non-operational time is compared to a threshold. If the amount of non-operational time is not greater than the threshold, then control passes to block 414 where an indication of non-operational time is provided at optional block 414. Additionally, at block 414, an estimate of the totalized flow may be computer based on the average of the flow rate at the beginning of the interval and at the end of the interval multiplied by the amount of non-operational time. If, at block 412, it is determined that the amount of non-operational time is greater than the threshold, then control passes to block 416 where an indication of the non-operational time is provided.

Although the present invention has been described with reference to preferred embodiments, workers skilled in the art will recognize that changes may be made in form and detail without departing from the spirit and scope of the invention.

What is claimed is:

1. A field device comprising:
   a power module coupleable to an energy harvester;
   a sensor configured to sense a process fluid variable;
   measurement circuitry coupled to the sensor and configured to provide an indication of a sensed analog value;
   wireless process communication circuitry configured to wirelessly communicate in accordance with a process communication protocol;
   a controller coupled to the measurement circuitry and the process communication circuitry, the controller including timing circuitry and being configured to generate periodic time signals during an operational period of the field device and store an indication of operational time based on the periodic time signals in non-volatile memory; and
   wherein the controller is configured to employ the wireless process communication circuitry to provide an indication of operational time to a remote device and to receive an indication of non-operational time from the remote device.

2. The field device of claim 1, wherein the indication of the periodic time signal enables the remote device to calculate an amount of non-operational time for the field device.

3. The field device of claim 2, wherein the controller is further configured to provide a local output indicative of the non-operational time.

4. The field device of claim 3, wherein the controller is further configured to compare the duration of non-operational time to a threshold value, and, based on the comparison, generate the action signals for a local output.

5. The field device of claim 1, wherein the field device comprises a flowmeter configured to monitor a flow of process fluid.

6. The field device of claim 1, wherein the field device is coupled to a non-reliable source of electricity.

7. The field device of claim 6, wherein the non-reliable source of electricity is an energy harvester.

8. The field device of claim 7, wherein the energy harvester is a thermoelectric energy harvester.

9. The field device of claim 1, and further including a process variable sensor operably coupled to the controller and configured to provide an indication of a process variable.

10. A flowmeter, comprising:
    a power module configured to receive energy from a non-reliable source of power and provide electrical power to components of the flowmeter;
    a sensor configured to provide a signal indicative of a flow of process fluid;
    a time counter configured to monitor an operating duration of the flowmeter in which the sensor generates sensor signals indicative of the flow of process fluid and generates time counter signals indicative of the operating duration of the flowmeter;
    a controller configured to receive the sensor signals and the time counter signals, the controller being configured to provide a flow output based on the sensor signal, the controller being further configured to store an indication of operating time based on the time counter signals and communicate the periodic time counter signals to a remote device; and
    process communication circuitry operably coupled to the controller, wherein the process communication circuitry is employed by the controller to communicate the periodic time counter signals to the remote device using a process communication protocol.

11. The flowmeter of claim 10, further comprising:
    a data store comprising non-volatile memory configured to receive and store the time counter signals from the time counter within the non-volatile memory.

12. The flowmeter of claim 10, wherein the flowmeter is a vortex flowmeter, and wherein the sensor comprises a piezoelectric cell.

13. The flowmeter of claim 10, wherein the power module is coupled to an energy harvester.

14. The flowmeter of claim 13, wherein tide energy harvester is a thermoelectric energy harvester.

15. A method of monitoring flow using a flowmeter and energy harvester, the method comprising:
    querying, at real-time $t_1$, the flowmeter to provide an indication of its operational time ($Op_{t1}$) using process communication;
    querying, at real-time $t_2$, the flowmeter to provide an indication of its operational time ($Op_{t2}$) using process communication;
    calculating an elapsed real-time;
    calculating a difference in operational time;
    comparing the elapsed real-time to the difference in operational time to determine amount of non-operational time; and
    providing an output indicative of the amount of non-operational time.

16. The method of claim 15, wherein the amount of non-operational time is zero and the output is a certification of continuous operation.

17. The method of claim 15, wherein the amount of non-operational time is greater than zero but less than a threshold, and wherein the output includes an estimation of flow total during the non-operational time.

18. The method of claim 17, wherein the estimation of flow is based on an average of a flow rate at real-time $t_1$ and real-time $t_2$ and the amount of non-operational time.

19. The method of claim 15, and further comprising causing the flowmeter to provide a local indication of non-operational time.

\* \* \* \* \*